Oct. 17, 1950 H. M. WATTS, JR 2,526,595

PRECISION PULSE FAILURE ALARM CIRCUIT

Filed Oct. 11, 1945 6 Sheets-Sheet 1

INVENTOR
H. M. WATTS, JR.
BY
N. D. Ewing
ATTORNEY

Oct. 17, 1950 H. M. WATTS, JR 2,526,595

PRECISION PULSE FAILURE ALARM CIRCUIT

Filed Oct. 11, 1945 6 Sheets-Sheet 2

INVENTOR
BY H. M. WATTS, JR.
N. S. Ewing
ATTORNEY

TIMING WAVE AMPLIFIER

PHASE SHIFTER

INVENTOR
H. M. WATTS, JR.
BY N. S. Ewing
ATTORNEY

PRECISION PULSE FAILURE ALARM CIRCUIT

Filed Oct. 11, 1945

INVENTOR
H. M. WATTS, JR.
BY N. S. Ewing
ATTORNEY

Oct. 17, 1950 H. M. WATTS, JR 2,526,595

PRECISION PULSE FAILURE ALARM CIRCUIT

Filed Oct. 11, 1945 6 Sheets-Sheet 5

OUTPUT AMPLIFIER

PULSE SELECTOR

INVENTOR
H. M. WATTS, JR.
BY N. A. Ewing
ATTORNEY

INVENTOR
H. M. WATTS, JR.
BY
N. S. Ewing
ATTORNEY

Patented Oct. 17, 1950 2,526,595

UNITED STATES PATENT OFFICE 2,526,595

PRECISION PULSE FAILURE ALARM CIRCUIT

Henry M. Watts, Jr., Summit, N. J., assignor to Bell Telephone Laboratories, Incorporated, New York, N. Y., a corporation of New York Application October 11, 1945, Serial No. 621,741

3 Claims. (Cl. 177—311)

This invention relates to precision timing circuits and more particularly, to circuits for producing a rising voltage wave having equally spaced time markers or pips thereon.

A principal object of the invention is to provide an indicator for signalizing the absence of the time markers or pips, arising from circuit failure or the like.

An object of the invention is to provide an alarm circuit for monitoring a series of vacuum tubes to signalize a fault or inoperative condition in any tube of the series or the associated circuits.

A principal feature of the invention is the provision of a radio range unit, including a wave generator for producing a rising exponential wave having superimposed thereon a series of equally spaced pips, and a neon tube indicator for signalizing the absence of said pips.

The primary function of a range unit in a radio object location and detection apparatus is to determine the distance between the apparatus and a distant target. This is accomplished by generating a timing pulse in the range unit, which follows the radiated or transmitted pulse by a known and controllable interval of time, and then measuring the elapsed time ($t$) between the transmitted (or radiated) pulse and the return echoes from the target. The measured time interval is calibrated in yards of range, representing $2d$ (the distance to and from the target). The fundamental of electromagnetism principle involved herein is the constancy of the velocity of propagation of electromagnetic energy in free space, from which is derived the relation:

Distance of propagation of electromagnetic waves=elapsed time$\times C$ where $C$=velocity of light or other electromatic energy in free space.

In basic function, the range unit may be considered as the electrical analog of a stop-watch. The variably delayed and controllable time interval, established therein divided into precision time measuring intervals, may be looked upon as an electrical time or distance measuring yard stick.

In operation, the range unit is triggered by the "sync" pulse or start pulse from the modulation generator of the transmitter (not shown), and delivers an output or range pulse, which may be delayed in time from the start pulse by an amount controlled by the setting of the range crank.

A range unit, as disclosed in the United States applications, Serial No. 491,791, filed June 22, 1943, now Patent No. 2,422,204, and Serial No. 505,024, filed October 5, 1943 by L. A. Meacham, now Patent No. 2,422,005, secures a high degree of precision in time measurement by the use of an electrical circuit, in which a train of equispaced sharp voltage pulses or pips are superimposed on an exponentially-rising voltage wave. The discrete pips are derived from a precision timing L-C oscillatory circuit by suitable "tailoring" thereof, while the exponential wave is produced in an R-C circuit with an appropriate time constant.

The absence of pips will result in the delivery of an inaccurately delayed pulse from the range unit, with a corresponding inaccurate range reading. However, in accordance with the invention, positive provision has been made to warn the operator concerning the absence of "pips," thereby permitting him to switch the unit to a lower precision operating state, capable of providing sufficient and satisfactory accuracy at long ranges, or to readjust a control in the unit for medium precision operation at short ranges.

Referring to the figures of the drawing.

Figure 12:
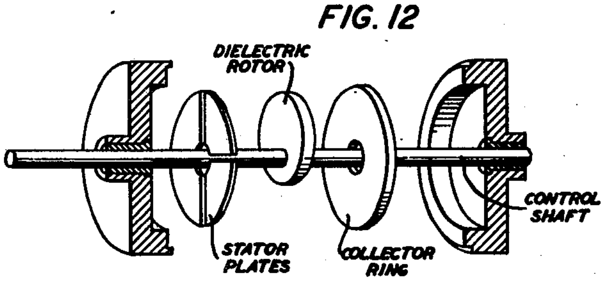
Figure 13:
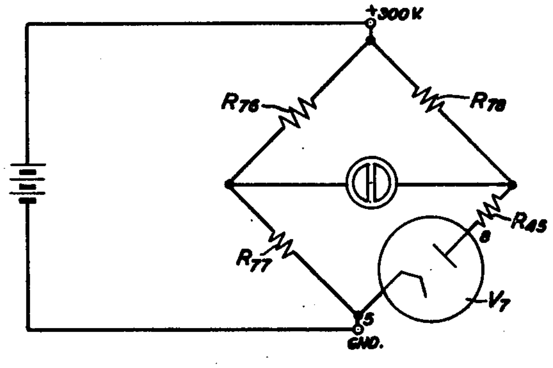
Figure 14:
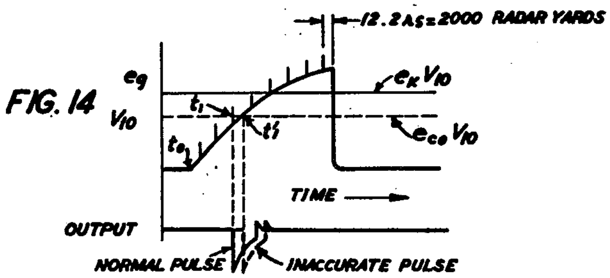

Figs. 4 to 11 disclose component circuits of the range unit, arranged sequentially;

Figure 12 shows the phase shifter structure;

Fig. 13 is a Wheatstone bridge diagram of the alarm circuit; and,

Fig. 14 is an explanatory diagram of the pulse selector.

The range unit disclosed herein may be operated in either of two ways, namely, as a high precision, medium range unit or as a medium precision, long range unit, by means of a selector switch.

With the switch in the high precision position, time measurement is accomplished by a phase shifting of the precision pips with an accuracy of $\pm$(15 yards+0.1 per cent of the measured range) over a range up to 60,000 yards. With the switch in the medium precision position, time measurement is accomplished by means of the voltage-time characteristic of a conventional R-C circuit, to permit the measurement of ranges up to 80 miles with an accuracy of ±(0.1 mile+2 per cent of the measured range). Separate counters (not shown), which are part of the gear assembly and which may be viewed through windows, are provided for indicating ranges for the two positions of the selector switch.

Figures 1, 2, 3:
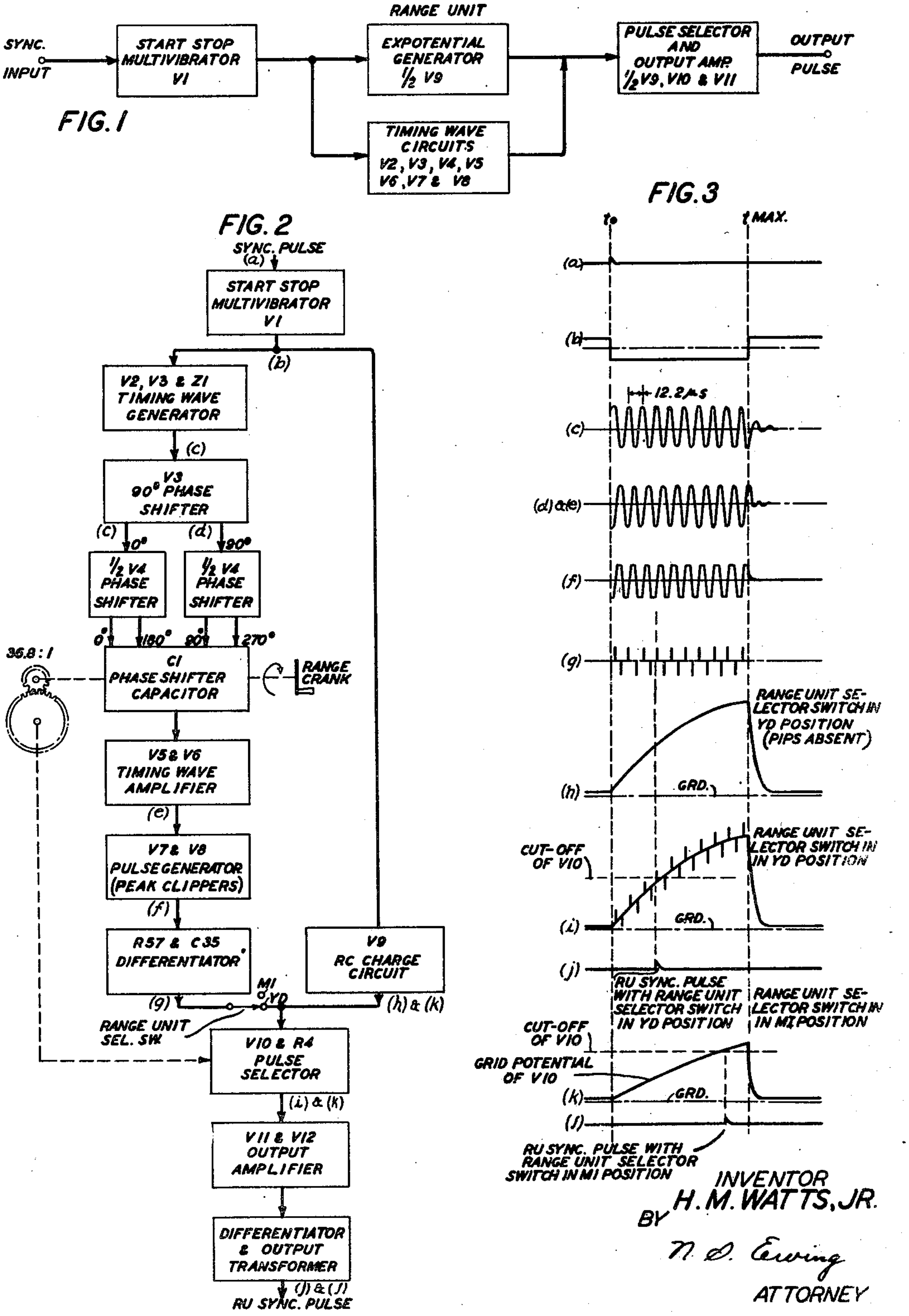
Fig. 1 shows a block schematic of the range unit.
Fig. 2 shows a more detailed block schematic of the range unit.
Fig. 3 shows various wave shapes developed in the operation of the range unit.

Functional block diagrams of the range unit with illustrative wave shapes are shown in Figs. 1, 2 and 3 and the circuit schematic in Figs. 4 to 11, inclusive. The functional diagrams indicate broadly the relationship of the various component parts of the circuit to each other.

A brief functional description will first be given, followed by a detailed circuit analysis.

Theoretical wave forms or shapes developed in the various circuit components are presented for explanatory purposes in connection with Figs. 4 to 11, inclusive, which show the individual component circuit elements of the range unit connected together in operative sequence.

Fig. 1 is a block circuit diagram of the range unit. A synchronizing pulse from an external circuit triggers the start-stop multivibrator, which in turn drives tube $V_2$ in the timing wave circuits and the exponential generator tube $V_9$. The timing wave circuits produce an output consisting of a train of equal amplitude voltage pulses or pips for each repetition cycle. These pips are superimposed on the exponential wave generated by $V_9$. Tube $V_{10}$ in the pulse selector circuit, is biased by the voltage drop through the range adjustment potentiometer, so that plate current is quiescently cut off. The composite voltage wave shown in Fig. 14 is impressed on the grid of tube $V_{10}$, so that the tube begins to pass plate current at an instant dependent on the shape of the exponential, the magnitude of the pips, the phase position of the pips on the exponential, and the cathode potential of tube $V_{10}$. Of these factors, the amplitude of the pips and the shape and amplitude of the exponential are fixed. The phase position of the pips and the cathode potential of tube $V_{10}$ are adjusted by a phase shifting condenser and a range potentiometer, respectively. These components are geared together and controlled by the range crank.

As shown in further detail in Figs. 2 and 3, the input to the start-stop multivibrator is a positive triggering pulse *a* which is supplied by a modulation generator in a transmitter-receiver unit (not shown). The output pulse of the start-stop multivibrator is a negative square wave as represented by *b* of Fig. 3, which pulse serves to key both the timing wave generator (a precision L-C oscillatory circuit) and the exponential wave generator (an R-C charging circuit) as illustrated in Fig. 2.

The exponential wave generator produces output waves of saw-tooth form, while the timing wave generator concomitantly produces constant amplitude sine wave trains for precision "pip" formation.

The duration of the multivibrator output pulse *b* exceeds the time required for an echo to return from a target at maximum range of the radar system.

The timing wave generator alternately excites and quenches a precision antiresonant (L-C) circuit to produce the sinusoidal timing wave *c*, the frequency of which is 81.955 kilocycles. This particular frequency corresponds to a period equal to the time of travel of microwave energy to and from a target 2,000 yards away.

Referring to Fig. 2, the timing wave *c* is applied to a circuit to produce a phase-shifted timing wave which can be moved continuously along the time scale in relation to the starting pulse *a*. This is accomplished by generating four voltages separated 90 degrees in phase and applying these four phase voltages to four segmented stator plates of a variable capacitor.

Then, the timing wave amplifier circuit performs the function of amplifying the phase-shifted timing wave. This amplified wave is fed into a pulse generator which is overloaded, considerably so that the wave is clipped to produce square waves in its output circuit as shown by wave *f*. This output wave is then differentiated to produce a train of sharp positive and negative timing pulses or precision pips *g*.

The grid of the first stage of the R-C circuit and pulse selector is normally at a positive potential, thus reducing the voltage at the plate to very near ground. When the square wave output *b* of the multivibrator start-stop circuit is applied to this grid, the tube is cut off and the capacity in its plate circuit is charged exponentially through a resistance, thereby producing an exponential voltage wave. The amount of capacitance in the plate circuit depends on the position of the Range Unit Selector switch. With the switch in the high precision position, the capacitance of the circuit is such that the exponential wave *h* is produced. Placing the switch in the medium precision position introduces additional capacitance in the plate circuit, so that its R-C time constant is increased about three times resulting in the slower rising exponential wave *k*.

With the Range Unit Selector switch in the high precision position, precision pulses from the pulse generator are applied in series with the exponential voltage to the grid of the pulse selector tube, thereby producing the saw-tooth wave *i*. By controlling the cathode potential of the pulse selector tube with a potentiometer, its cut-off point may be shifted. The first pulse extending above the cut-off point causes a sudden flow of plate current which drops the plate potential sharply. If the potentiometer were rotated without moving the phase shifter capacitor, the output pulse of the range unit would jump in 2,000-yard steps. Smooth and precisely timed output pulses are obtained by gearing the phase shifter capacitor to the potentiometer through a 36.8:1 gear reduction, so that the precision pulses are moved continuously along the exponential voltage rise determined by the R-C time constant. The first pulse to turn on the pulse selector tube causes a sharp pulse in the plate circuit, which is fed to the output amplifier.

Placing the Range Unit Selector switch in the medium precision position, converts the range unit in the R-C exponential charging system, in which the precision pulses from the precision pulse generator (tubes V2 through V8 and including phase shifter capacitor C1) are not used. By simultaneously increasing the R-C time constant of the charging circuit, the range measuring capability of the range unit is increased by nearly three times. A separate counter designated Range in Miles is geared to the potentiometer for indicating the longer ranges measured by the range unit for all potentiometer positions with the switch set for medium precision.

The output amplifier acts as a pulse generator which is triggered by the drop in voltage output of the selector circuit when tube $V_{10}$ thereof starts to conduct. Its steep-fronted output pulse is differentiated, inverted, and reduced in amplitude and transmitted over a coaxial line to other units of the system. See *j* and *l* of Fig. 3.

The range unit may conveniently and functionally be subdivided into three sections, to wit:

(A) The start-stop multivibrator
(B) The precision pulse generator
(C) The R-C circuit

(A) START-STOP MULTIVIBRATOR

The function of the start-stop multivibrator is to furnish a negative output pulse, whose start is coincident with the synchronizing pulse, and whose duration exceeds the time required for an echo to return from a target at maximum range.

Figure 4:
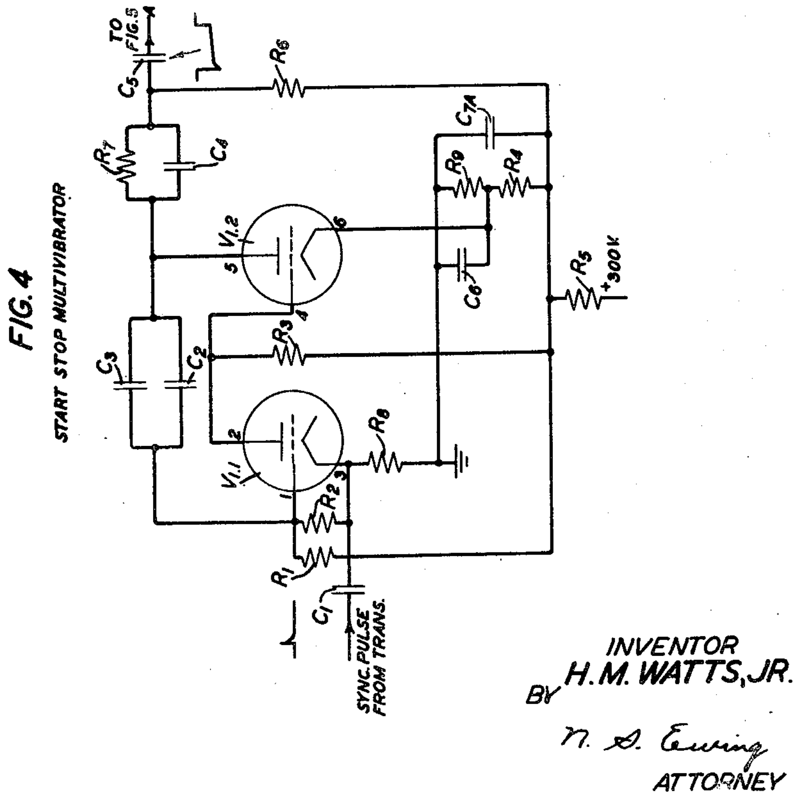

This function is performed by two tubes and the associated circuit components shown in Fig. 4. The first tube ($V_{1.1}$) is normally conducting, its grid 1 being held slightly above cathode potential, because of the positive voltage fed to the grid by the voltage divider consisting of $R_1$ and $R_2$. The plate current drawn by this tube through $R_3$ reduces the potential of plate 2 to about 30 volts. Grid 4 of tube $V_{1.2}$ is directly connected to plate 2 and, therefore, its potential is also 30 volts above ground. This tube is in a non-conducting condition, however, because its cathode 6 is held about 65 volts above ground by the voltage divider $R_4$ and $R_9$. Consequently, plate 5 remains at approximately 290 volts above ground, until a starting impulse is applied to cathode 3.

The positive synchronizing pulse is differentiated by $C_1$ and $R_8$ and applied to cathode 3 of tube $V_{1.2}$. This reduces the plate current of tube $V_{1.2}$, and its plate potential and that of grid 4 of tube $V_{1.2}$ rise with respect to ground. Tube $V_{1.2}$ starts to conduct and the potential at plate 5 decreases. Since this plate is coupled through condensers $C_2$ and $C_3$ to grid 1 of tube $V_{1.1}$, the grid is driven negative, thus reinforcing the action of the positive starting pulse applied to the cathode. This reacts through the circuit and produces the steep leading edge of the negative output pulse. When this action ends, tube $V_{1.1}$ is completely cut off.

The duration of the negative pulse output of the start-stop multivibrator depends on the time required for condensers $C_2$ and $C_3$ to discharge through resistors $R_1$ and $R_2$. The potential of grid 1 rises exponentially as $C_2$ and $C_3$ discharge until cut-off potential is reached. Tube $V_{1.1}$ starts to conduct and the resulting drop in plate 2 potential reacts around the circuit causing the negative output pulse of the multivibrator to rise sharply. The values of condensers $C_2$ and $C_3$ are so selected that the duration of the output pulse exceeds the time required for an echo to return from a target at maximum range (80 miles).

The rise in potential of plate 5 at the end of the pulse is quite rapid until grid 1 of $V_{1.1}$ begins to draw grid current. Its sharp rise then becomes more gradual because capacitors $C_2$ and $C_3$ must be recharged by current through $R_6$ and $R_7$. The two resistors $R_6$ and $R_7$ in the plate circuit 5 act as a voltage divider to reduce the square wave output of the start-stop circuit to the desired amplitude. Capacitor $C_4$ acts to preserve the steepness of the start of the square wave output. Capacitor $C_6$ prevents cathode feedback from decreasing the gain of $V_{1.2}$ during the start of the square wave.

(B) PRECISION PULSE GENERATOR

The portion of the range unit comprising vacuum tubes $V_2$ through $V_8$ is used as a precision pulse generator to obtain the range-measuring precision required when measuring ranges up to about 60,000 yards. This portion of the circuit generates voltage pulses of precise frequency that may be moved linearly along the time scale by rotation of a control shaft. These voltage pulses are superimposed on the exponential wave generated in the R-C generator ($V_9$) to control precisely the action of vacuum tubes $V_{10}$, $V_{11}$ and $V_{12}$ when the Range Unit Selector switch S1 is in the YD position. Ranging of targets beyond 60,000 yards is done with switch S1 in the MI position, in which case the output of the precision pulse generator is not used and is grounded by action of relay K1.

Figures 8, 9:
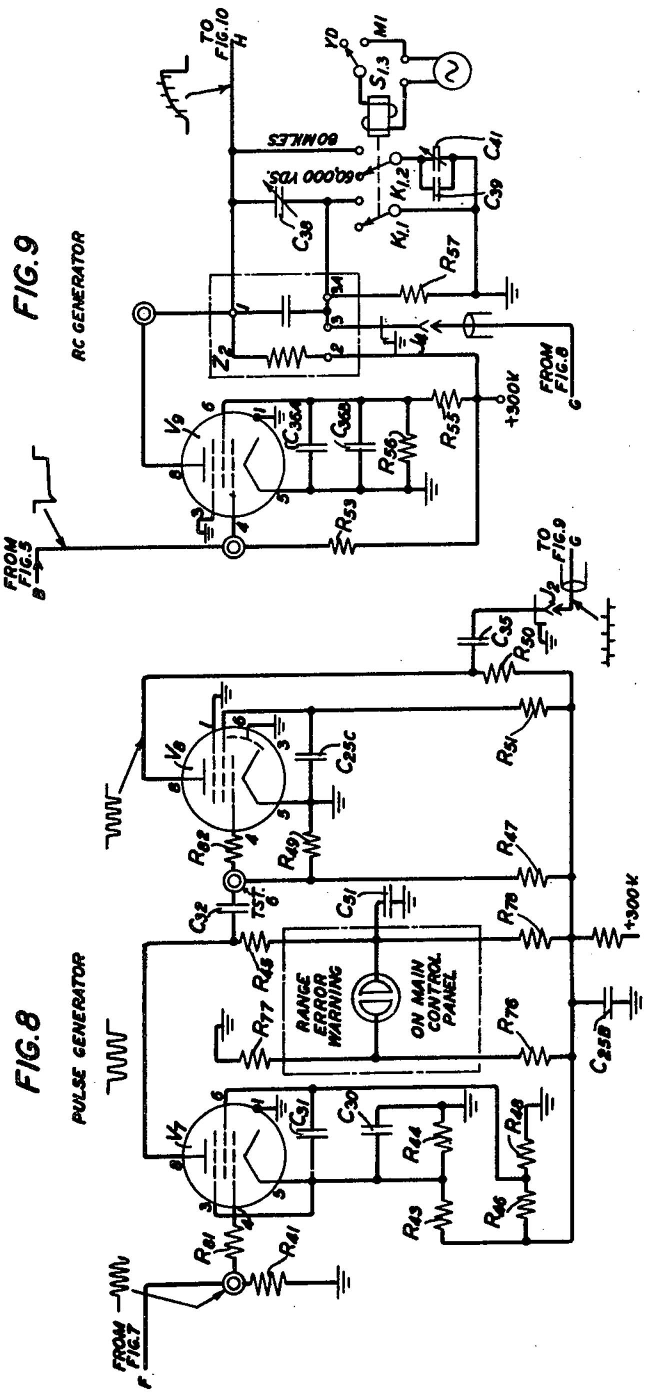

The precision pulse generator consists primarily of four parts:

(*a*) A timing-wave generator (Fig. 5)
(*b*) A phase shifter (Fig. 6)
(*c*) A timing wave amplifier (Fig. 7)
(*d*) A pulse generator (Fig. 8)

The function of each part is briefly summarized in the following statements. The timing wave generator generates a sine wave of precise frequency, whose phase and time delay are constant referred to the starting pulse. A four-phase voltage is generated from the single-phase voltage provided by the timing wave generator and is applied to the plates of the phase shift capacitor which provides an output voltage whose phase angle, referred to that of the timing wave, is linearly dependent only on the angular position of the control shaft of the phase shift capacitor. The timing wave amplifier amplifies the voltage derived from the phase capacitor. The pulse generator converts the timing wave into pip-like pulses, whose frequency precision is determined by the timing wave.

(*a*) *Timing wave generator*

The timing wave generator consists of a double triode ($V_{2.1}$ and $V_{2.2}$), a tube $V_3$, and an oscillatory L, C network Z1. See Fig. 5.

Since the timing wave generator is operated by the square wave output of the start-stop multivibrator, it follows that the precision timing wave may be "turned on" by the negative portion of the square wave and "turned off" by the positive portion. In order for current to flow through the oscillatory network Z1, it must also flow through $R_{11}$ and the plate-to-cathode circuits of the two halves of $V_2$ to ground. It follows that both triode sections of $V_2$ must be conducting to permit current to flow. This is actually the condition existing during the positive pulse interval of the square wave output from $V_1$. $V_{2.1}$ is conducting since $R_{10}$ is connected from grid 1 to cathode 3, and $V_{2.2}$ is conducting since $R_{12}$ is connected from grid 4 to cathode 6 (ground).

While these two triodes are conducting, they each have a plate-to-cathode resistance of about 10,000 ohms and, since $R_{11}$ in the plate circuit is also 10,000 ohms, a current of 10 milliamperes flows through the path which includes the inductor L in the oscillatory network Z1. Therefore, $R_{11}$ and the two triodes absorb 100 volts apiece of the 300 volts supply.

The start-stop wave is applied to grid 1 and grid 4 of $V_2$ through capacitors $C_8$ and $C_9$, respectively. During the negative portion of the start-stop wave, both grids are driven beyond cut-off and held at this point. When these two triodes are cut off, their plate resistance changes from a low value to an open circuit and causes the continuing current associated with the magnetic field of the inductor L in (tuned circuit) Z1 to flow into the associated capacitor C. This circuit is thus left in a state of free oscillation, at a frequency determined by the resonant frequency of Z1 plus the effect of trimmer capacitor $C_{12}$. The frequency of the precision, sinusoidal, timing wave, namely, 81.955 kilocycles, corresponds to 2,000 yards per cycle, and, in order to keep this frequency accurate, the temperature of the L-C circuit is controlled at 140° F. with a stability of ±1° F.

The center line of the timing wave is held constant throughout each pulse period and independent of the pulse rate by capacitor $C_{7B}$ which maintains a constant state of charge regardless of the fraction of each period that the two halves of $V_2$ are active. One hundred volts appear across $C_{7B}$ due to the 200-volt drop across resistor $R_{11}$ and $V_{2.1}$ while the two triodes are conducting.

The timing wave is always started by cutting off the current in the inductor L of Z1. Therefore, it always starts from zero in the positive direction as shown in Fig. 3 (c). The amplitude of the first cycle of the timing, sine wave train is dependent upon the inductance L in Z1, the capacitance C plus that of trimmer condenser $C_{12}$ and the current through the inductor of Z1 previous to the instant the current is cut off. Since all of these factors are constant at the start of each pulse period, the amplitude of the first cycle of the timing wave train is constant from period to period.

In order that succeeding stages of the range unit shall behave uniformly throughout the active period, the timing wave is sustained at a constant amplitude by means of positive feedback provided through the cathode follower action of tube $V_3$. The timing wave is applied to grid 4 of $V_3$, which may be considered as an amplifier having a voltage gain of 1, its output being taken from the cathode. This output, whose voltage is an accurate copy of the timing wave, is connected through $R_{13}$ to a center tap of the inductor L in Z1. The antiresonant impedance of Z1 is about 200,000 ohms, and the impedance looking in at the midpoint of the coil is 50,000 ohms. $R_{13}$ matches this impedance and, therefore, half of the cathode voltage is impressed across terminals 2 and 3 of the coil. This voltage is doubled by the autotransformer action of the coil and thus becomes identical with the timing wave at the grid of $V_3$. Therefore, the net gain about the feedback loop is unity, and while this condition exists, no rapid increase or decrease in timing wave amplitude can accur.

(b) *Phase shifter*

The phase shifting circuit consists of tube $V_3$, double triode $V_4$ and associated circuit components, in addition to phase shifter capacitor $C_1$ located on the range unit gear assembly. The tube $V_3$, in addition to providing feedback for the tuned circuit Z1 in the timing wave generator, also produces two output waves which are replicas of the timing wave. By proper choice of the inductance and resistance in the plate circuit and of the capacitance and resistance in the cathode circuit of tube $V_3$, these two voltages are 90 degrees out of phase. The timing wave is applied to the control grid 4 of tube $V_3$, which operates as a cathode follower and produces a wave at the cathode in phase with the timing wave and another wave at the plate 8, 90 degrees out of phase therewith. Accordingly, the phase angle of the voltage developed across the cathode-to-ground elements may be adapted as the zero phase reference and that developed across the plate-to-ground circuit as −90 degrees with respect thereto.

Figure 5:
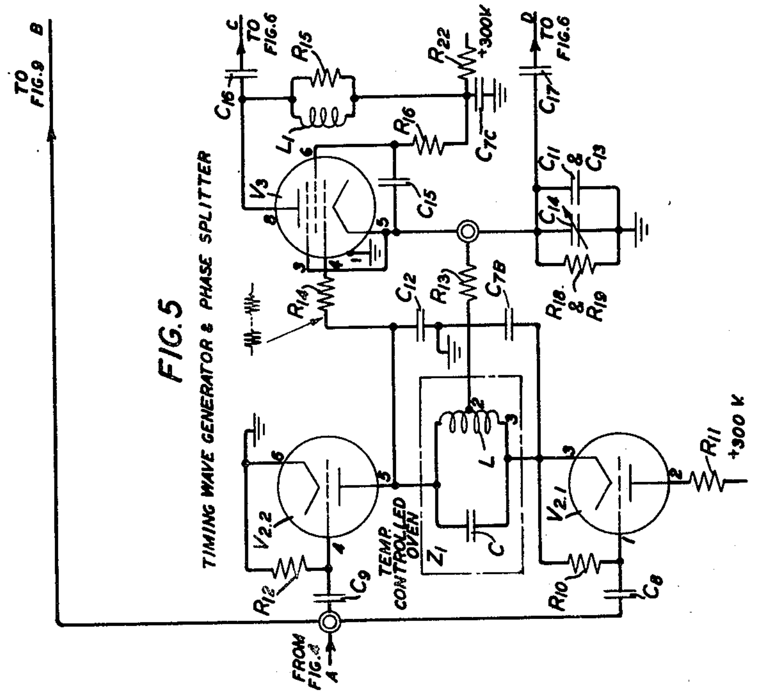
Figure 6:
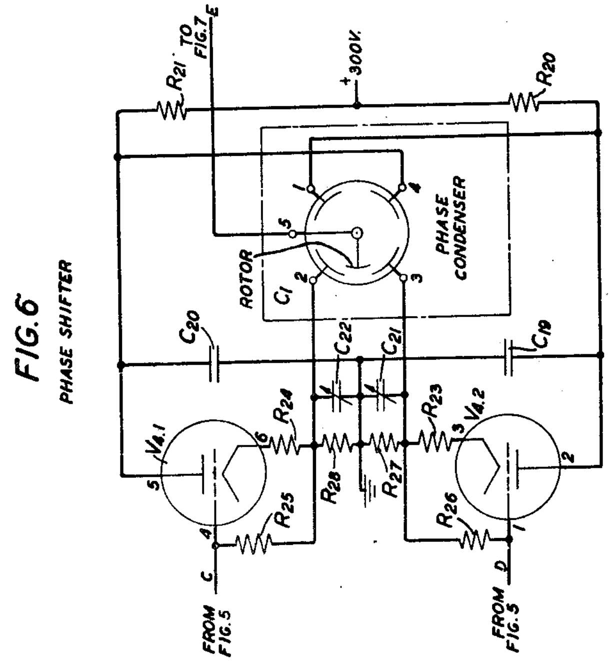

The output from the cathode of tube $V_3$ is applied to the grid 1 of tube $V_{4.2}$ through capacitor $C_{17}$ and the output from plate 8 of $V_3$ is applied to the grid 4 of $V_{4.1}$ through capacitor $C_{16}$ (see Figs. 5 and 6). These two triodes making up $V_4$ act as phase inverters to supply four balanced voltages in exact quadrature and at relatively low impedance to the four stator plates 1, 2, 3 and 4 of the variable phase shifter capacitor, $C_1$, located on the range unit gear assembly.

Resistors $R_{23}$ and $R_{24}$ provide grid bias for the two triode sections of $V_4$. Resistors $R_{27}$, $R_{20}$, $R_{28}$, and $R_{21}$ have equal resistance across which the four balanced output voltages appear. Capacitors $C_{21}$ and $C_{22}$ allow accurate adjustment of plate and cathode voltage phases. These are adjusted, as is $C_{14}$, at the time the over-all range calibration is made.

Referring to Fig. 6, the variable phase shifter capacitor $C_1$ shifts the phase of the timing wave continuously, thereby providing a delay which varies linearly with the angular position of the control shaft. The construction of this capacitor is shown functionally, Fig. 12. The quadrant stator plates 1, 2, 3 and 4 are of equal area and are supported by the front casting by means of polystyrene insulating supports. Collector ring 5 of this capacitor is accurately parallel to the stator plates and is supported by the back casting through polystyrene insulating supports. The eccentrically mounted rotor is a dielectric disc (R=6) having an area about equal to one stator plate. It is rigidly attached to the control shaft and has enough clearance so that it may be rotated freely between the stator plates and the collector ring. The capacitance between any stator plate and collector ring 5 is increased sixfold by interposing the dielectric rotor disc between the stator plate and the collector ring. When the dielectric rotor lies directly opposite a particular stator plate, the phase of the voltage picked up by the collector ring will be very closely the same as that applied to that plate. When the rotor is set to cover portions of two adjacent stator plates, the phase angle of the voltage picked up on the collector ring, will depend on the relative magnitudes of the voltages picked up from each stator plate, and will be between the phases of the two stator plate voltages.

Fig. 12 also indicates the relationship between the phase of the output voltage and the angular rotation of the control shaft. For any position of the rotor, the voltage fed from the stator plate to the collector ring is proportional to the area of the dielectric between plate and ring. The vector sum of the four voltages fed from the plates to the collector ring determines the magnitude and phase angle of the output voltage. Out-of-phase components are cancelled, and the resultant voltage on the collector ring has a phase angle equal to the angular displacement of the rotor from the stator plate 3 with the "zero phase" voltage (Fig. 6).

*(c) Timing wave amplifier*

Figure 7:
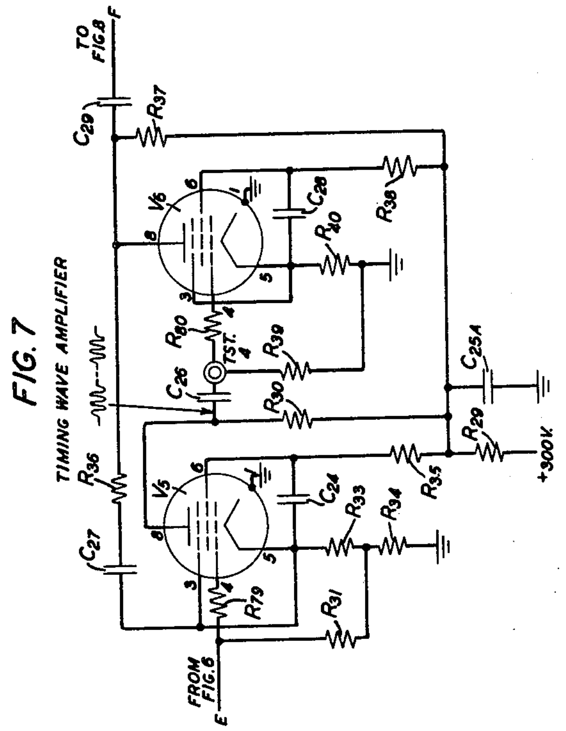

This circuit consists of two high-gain pentode amplifiers $V_5$ and $V_6$ and is shown schematically in Fig. 7.

The very low amplitude output of the phase-shifter circuit which is a wave train of 81.955 kilocycles lasting about 360 microseconds is impressed on grid 4 of the first amplifier tube $V_5$, the output of which is fed to tube $V_6$. These two tubes form a high-gain linear amplifier having a considerable amount of negative feedback, thus providing an extremely high-input impedance. This is an important feature, because there is a constant phase shift between the voltage pick-up from the stator plates of $C_1$ and the voltage applied to the grid of $V_5$. The phase shift is proportional to the output capacitance of $C_1$ divided by the input impedance of $V_5$, and must be small to minimize range error. The feedback, applied at the cathode of $V_5$, is estimated to increase the effective input impedance by a factor of approximately 36. The resistance of the grid leak $R_{31}$ thus becomes equivalent to 17 megohms. Since the capacitive output reactance of the phase-shifter capacitor $C_1$ is only about 0.15 megohm (13 micromicrofarads), the phase shift introduced by these elements is roughly 0.5 degree. As this shift is small, its variations cause no significant error in the range readings. The output of the timing wave amplifier is coupled through $C_{29}$ to the grid of the pulse generator tube $V_7$.

*(d) Pulse or pip generator*

The pulse generator produces a sharp pip each time the instantaneous amplitude of the timing wave passes through zero. It consists of vacuum tubes $V_7$ and $V_8$ shown schematically in Fig. 8.

$V_7$ is normally cut off due to the bias provided by the voltage divider consisting of resistors $R_{43}$ and $R_{44}$ connected to the cathode. However, when the large voltage swing derived from the timing-wave amplifier is impressed on the grid of this tube, it clips the impressed wave along its center line, since $V_7$ conducts only during the positive portion of the timing wave. This effect is aided by the use of a high cathode impedance to furnish negative feedback so that the grid of the tube is never driven positive with respect to its cathode. The output wave from this tube is effectively the upper half of the timing wave. Capacitor $C_{32}$ couples this amplified and inverted wave to grid 4 of $V_8$.

In the quiescent state, $V_8$ is fully conducting; but when the center-clipped waves are impressed on this tube, it is cut off very sharply. The voltage wave impressed on the tube drives the tube from cut-off to full conduction each cycle of the timing wave and, therefore, the tube output is a train (comprising about 30 cycles) of an approximately rectangular wave having exactly the period of the original timing wave. The stub ends of the center-clipped wave are faithfully amplified but the negative peaks of the waves are completely cut off. These square waves are differentiated in the circuit containing capacitor $C_{35}$ and resistor $R_{57}$ (in R-C generator circuit) to produce trains of alternate positive and negative timing pips, which are superimposed on the exponential voltage developed in the plate circuit of the R-C generator tube $V_9$ for impression on the pulse selector circuit $V_{10}$. The positive pips are the desired product of the precision pulse generator while the negative pips are incidental. The pips having a spacing or interval equivalent to a 2,000 yard radar space interval (the period of the timing wave).

The superposition of the precision timing pulses (or pips), derived from the sinusoidal timing wave, on the exponential voltage developed by the R-C network Z2, greatly increases the accuracy of the R-C delay portion of the circuit as described below. It should be noted that these pips are utilized only when measuring ranges up to 60,000 yards. Operation of the Range Unit Selector switch S1 to the MI position eliminates the pips by shorting out $R_{57}$ of the R-C generator to ground, whereupon the pulse selector circuit will operate only on the exponential voltage developed in the R-C generator circuit.

PIP FAILURE INDICATOR

Any circuit fault, which prevents or interferes with the superposition of the precision pips on the exponential curve will cause the selector tube $V_{10}$ to fire about 6 microseconds late, introducing a corresponding error of about 1,000 yards plus a ±300-yard uncertainty. This would place a serious limitation on the reliability of the range unit, inasmuch as any of a number of tubes $V_2$ to $V_7$ or their associated circuits may become inoperative, causing the failure of the precision pips without the attendant disappearance of the output pulse.

Thus, for a range crank setting corresponding to about a four thousand yard delay, the voltage wave on the grid of tube $V_{10}$ rises into the plate current condution region at instant $t_1$ as shown in Fig. 14. Time $t_1$ corresponds to the instant the grid voltage wave passes above cut-off potential as indicated by the line $C_{co}$. Time $t_0$ corresponds to the beginning of the repetition cycle. If the pips disappear from the exponential owing to the failure of any tube or its associated circuit $V_2$ to $V_7$, inclusive, then tube $V_{10}$ will begin to conduct at time $t_1'$. Since $V_{10}$ normally fires at the middle of the pipe, and since the top of pip ($n$) is at the same level as the base of pip ($n+1$), therefore ($t_1'-t_1$) represents about one-half of the time between pips, or about 6 microseconds. Thus, the final output pulse will occur approximately 6 microseconds late, which corresponds to a one-thousand yard error.

Such errors, up to 1,000 yards, may occur when the range unit selector switch S1 is in the YD position in the event the timing pips generated by the precision pulse generator are missing. The range unit will deliver an inaccurately delayed output pulse without the operator's knowledge thereof, if the sharp pips are not present.

A "Range Error Warning" lamp on the control panel has been provided as an alarm indication for signalizing the presence of any circuit fault in the circuit from $V_2$ to $V_7$, inclusive (see Fig. 8). The alarm circuit which is connected to the plate of tube $V_7$ comprises a Wheatstone bridge circuit (see Fig. 13) consisting of resistances $R_{45}$, $R_{76}$, $R_{77}$, $R_{78}$, and the cathode-to-plate circuit of tube $V_7$. The plate current of $V_7$ flows through $R_{45}$ and $R_{78}$ from the +300-volt supply. Alternating current from the $V_7$ plate circuit is kept out of the bridge by means of a by-pass condenser $C_{51}$ (see Fig. 8). Register $R_{45}$ constitutes the plate load resistor of tube $V_7$.

Tube $V_7$ is biased by the voltage divider comprising resistors $R_{43}$ and $R_{44}$ whereby in the absence of signals on the grid, no plate current will flow. In the presence of signals on the grid, all positive excursions of the signal will cause plate current to flow so that normally when the timing wave circuit is functioning properly, there is an average plate current of 1 milliampere. This current flowing through $R_{78}$ produces a 120-volt drop, which serves to bring the voltage at the junction of $R_{78}$ and $R_{45}$ to +180 volts. The voltage divider, consisting of $R_{76}$, $R_{77}$ establishes a voltage at the junction thereof of +180 volts also. Accordingly, the voltage across the neon lamp will therefore normally be zero.

Should any fault or failure or inoperative condition develop in the circuit of $V_2$ to $V_6$, inclusive, resulting in no signal appearing at the grid of tube $V_7$, or should the electronic emission in tube $V_7$ fail, then current from tube $V_7$ through $R_{78}$ will cease and the voltage across condenser $C_{51}$ will rise until the neon tube is energized and ignited. After the neon lamp lights up, there is maintained across it a voltage drop of 60 volts and a current flow of .5 milliampere.

Should a short-circuit (or an open) develop in the plate circuit of tube $V_7$, then the voltage across condenser $C_{51}$ will drop in the case of a short-circuit or rise in the case of an open circuit, thereby resulting in the energization of the neon lamp as a warning signal or indication of the fault.

It should be noted, however, that circuit troubles in tube $V_8$ resulting in the loss of the timing wave will not be indicated by the warning lamp.

When the neon tube operates to indicate a fault or failure in the tubes or circuits, aforementioned, then cut-off adjustment potentiometer $R_3$ which is present in the cathode circuit of tube $V_{10}$ may be readjusted for emergency use of the range unit as a medium precision unit with switch S1 in position (YD).

Tube $V_8$ is a limiter amplifier which produces an 81.955-kilocycle train of square waves at its output.

(C) THE R-C DELAY CIRCUIT

The function of the R-C delay circuit of the range unit is to introduce a time delay between the starting pulse that actuates the start-stop multivibrator and the output pulse of the range unit. The circuit consists of the R-C generator, the pulse selector and the output amplifier. The principle employed to obtain delay in this circuit is based on the time required to build up the voltage across a capacitor when its charging current flows through a resistor.

(a) *R-C generator and pulse selector*

Figure 10:
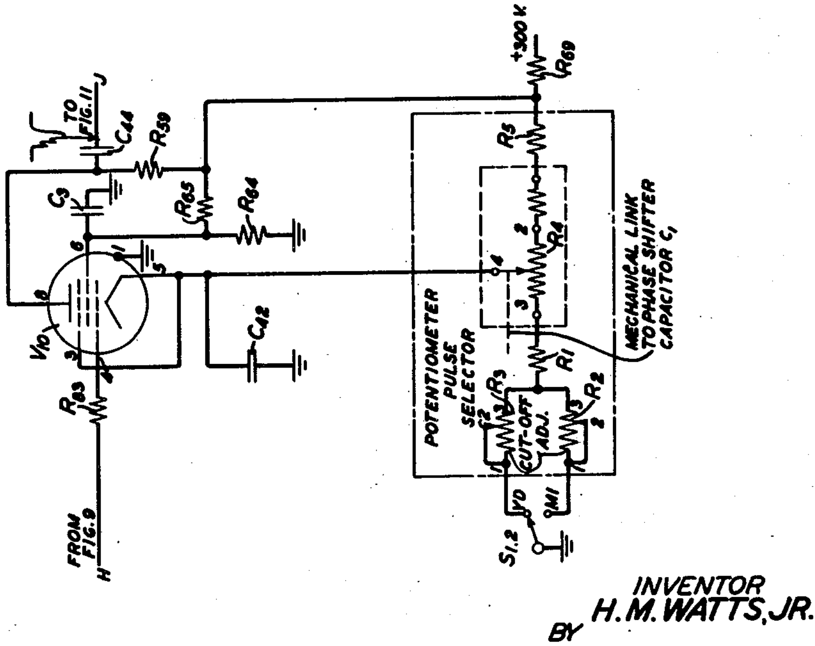

The R-C generator consists of tube $V_9$ and the R-C components in its plate circuit. The pulse selector consists of tube $V_{10}$ together with the associated circuit components. A schematic of these circuits is shown in Figs. 9 and 10.

In the quiescent state, tube $V_9$ has a positive voltage impressed on its grid through resistor $R_{63}$ causing it to draw sufficient plate current through the resistor in the $Z_2$ network to reduce its plate voltage to approximately zero with respect to ground. On the other hand, tube $V_{10}$ is cut off by the voltage impressed on its cathode from potentiometer $R_4$ located on the range unit gear assembly. The operation of the circuit is at all times under the control of the start-stop multivibrator previously described. When the original start pulse from an external unit causes the start-stop multivibrator circuit to function, a negative voltage greatly in excess of that required to stop conduction in tube $V_9$ is applied to the grid of this tube. This negative voltage instantaneously cuts off the plate current in $V_9$, and keeps it cut off for the duration of the negative pulse. The potential at the junction of the plate of $V_9$ and the grid of $V_{10}$ at once begins to rise exponentially at a rate determined by the R-C time constants of the plate circuit components.

The rate of rise depends on whether the Range Unit Selector switch S1, which controls relay K1, is in the YD or MI position. The position of S1 also determines whether the precision pips from the precision pulse generator are superimposed on the exponential voltage output of $V_9$.

The detailed operation of the circuit will first be discussed for the condition existing when switch S1 is in the YD position.

The rate of the exponential rise in voltage at the plate of $V_9$, when S1 is in the YD position, is determined by the time required to charge the capacitor in the network Z2 through the resistor in this network. The time constant of the network and the associated adjustable capacitor $C_{38}$ is approximately 700 microseconds. Maximum range measured by the range unit with S1 in the YD position is about 60,000 yards (equivalent to about 370 microseconds), so that the portion of the exponential curve used is fairly linear. When the square wave from the start-stop multivibrator $V_1$ goes positive, $V_9$ suddenly conducts, thereby discharging the capacitor in network Z2 in preparation for the next cycle. One cycle of the square input wave, therefore, produces the complete wave as shown in *h* of Fig. 3.

Sharp precision pulses (pips) from the precision pulse generator $V_8$ are formed across $R_{57}$, which is effectively in series with network Z2, and are superimposed on the exponential voltage developed in the plate circuit of $V_9$. The resultant wave form in the grid circuit of $V_{10}$ is shown in *i* of Fig. 3.

PIP SELECTION

The cathode of $V_{10}$ derives its bias from the voltage divider consisting of resistor $R_{69}$ in the range unit panel and resistors $R_1$, $R_5$, and potentiometers $R_3$ and $R_4$ in the range unit gear assembly. By rotating the shaft of potentiometer $R_4$, the cathode bias voltage of $V_{10}$ may be adjusted to any desired value over a wide range. It is this control of the cathode potential of $V_{10}$ that affords the means of pulse selection. Since the combined precision pulse wave train (pips) and R-C exponential appear at grid 4 of $V_{10}$, it follows that the first pulse extending above the cut-off point of $V_{10}$ causes a sudden flow of plate current. Since the rotation of the phase shifter capacitor $C_1$ in the precision pulse generator moves the "pips" along the exponential and the rotation of pulse selector potentiometer $R_4$ moves the cut-off point of $V_{10}$ with respect to ground, it therefore follows that by ganging capacitor $C_1$ to the potentiometer $R_4$ through a gear reduction drive of the proper ratio, the cut-off points of $V_{10}$ may be changed at the same rate the precision timing pulses (pips) move up the exponential. Thus, a single revolution of the range crank may cause the cathode voltage supplied to $V_{10}$ by potentiometer $R_4$ to rise 1 volt, thereby raising the cut-off point of $V_{10}$ by 1 volt. The single revolution of the range crank would also cause a particular pip to appear a little later on the rising exponential at the grid of $V_{10}$, so that it occurs at a potential 1 volt higher than before. A particular timing pulse, therefore, is made to follow the cut-off of $V_{10}$ as the range crank is manipulated, and is the first pulse to extend above the cut-off point of this tube. This produces a continuously variable time delay with a maximum of about 10,800 electrical degrees of the timing wave, which corresponds to a maximum radar range of about 60,000 yards.

Because of the curvature of the R-C exponential, a linear element for potentiometer $R_4$ would not track accurately with the phase shifter. It is necessary to use a specially-shaped resistor card on the potentiometer to produce the proper compensating non-linearity.

When it is desired to measure ranges beyond about 60,000 yards, it is necessary to place the Range Unit Selector switch S1 in the MI position. With the switch in this position, only the R-C generator and pulse selector circuit and the start-stop multivibrator of the range unit are utilized. The S1.3 contacts of switch S1 cause relay $K_1$ to operate which grounds the output of the precision pulse (pip) generator and also connects $C_{39}$ and $C_{41}$ in parallel with $C_{38}$ and the capacitor in network Z2. The additional capacity in the plate of circuit $V_9$ increases the time constant of the circuit about three times, so the exponential rise in voltage is less rapid. The result is, that for a given setting of the pulse selector potentiometer $R_4$, it takes about three times as long for the voltage on the grid of $V_{10}$ to rise to cut-off compared with the time required with switch S1 in the YD position. The range measuring capability of the range unit is thereby increased to about 80 miles. Ranges measured will not be so accurate without the use of the precision pulse generator, and ranging of targets within 60,000 yards should therefore be made with the selector switch in the YD position if accurate data is desired.

Separate range counters are provided, which are geared to the pulse selector range potentiometer $R_4$ and phase capacitor $C_1$ and indicate the range in yards or miles depending on the position at which switch S1 is set. These counters are viewed through windows in the main control panel and are illuminated by separate lamps. Through the action of switch S1.4, only the counter indicating ranges corresponding to the switch position is illuminated. This feature assures that the proper counter is referred to for range information.

Potentiometers $R_2$ and $R_3$ are provided for adjustment of the voltage across the pulse selector potentiometer $R_4$ when switch S1.2 is in the MI or YD positions, respectively.

(b) *Output amplifier*

Figure 11:
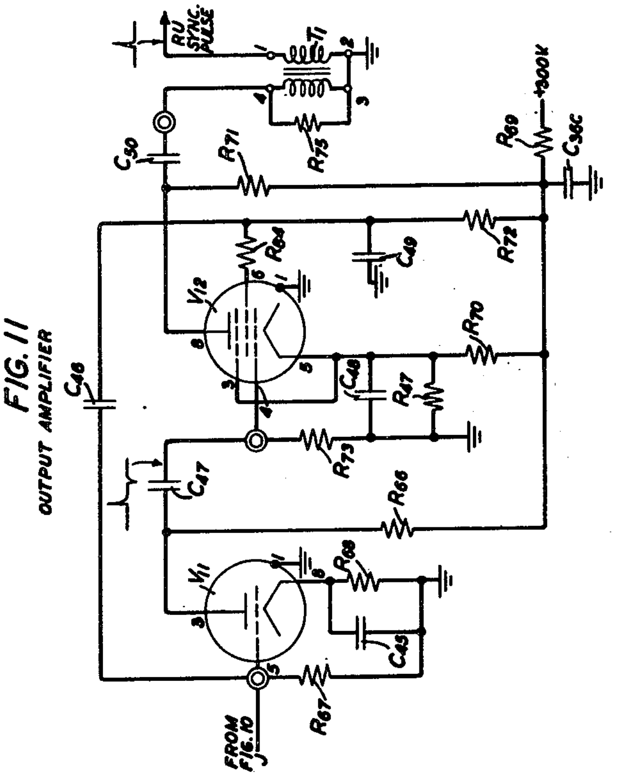

The output amplifier consists of tubes $V_{11}$ and $V_{12}$, together with associated circuit components (Fig. 11).

When the sudden flow of plate current occurs in $V_{10}$, a negative wave is produced which is applied through capacitor $C_{44}$ to grid 5 of $V_{11}$. This negative voltage causes the plate potential of $V_{11}$ to rise and apply a positive voltage to the grid of $V_{12}$. When the positive voltage on the grid of $V_{12}$ exceeds its cut-off potential, its screen and plate potential will drop sharply. A portion of the drop in screen voltage is fed back through capacitor $C_{46}$ to the grid of $V_{11}$ to reinforce the negative pulse supplied from $V_{10}$. $V_{11}$ is thus cut off completely, driving $V_{12}$ to maximum conductivity. During the time the negative wave appears on the grid of $V_{11}$, the tube is cut off, and remains so until the recovery period begins. A positive wave is produced at the plate of $V_{11}$ when the tube is cut off.

The output of $V_{11}$ is essentially a square wave which is differentiated by capacitor $C_{47}$ and resistor $R_{73}$ to form positive and negative impulses at grid 4 of $V_{12}$. Tube $V_{12}$ is resting at cut-off until the positive impulse drives it sharply to grid current, producing a negative wave at the plate of $V_{12}$. The steep-fronted negative wave is differentiated by capacitor $C_{50}$ and resistor $R_{75}$ and then applied to output transformer $T_1$. Transformer $T_1$ steps down the peak amplitude and matches the impedance of $V_{12}$ with the coaxial line output of the range unit. The output of transformer $T_1$ is a positive pulse (RU Sync pulse).

What is claimed is:

1. In combination, means for producing a rising saw-tooth wave with equispaced pips or markers thereon adapted to provide an electrical time scale, means for shifting said pips uniformly along the rising portion of said wave to measure precisely elapsed time intervals, a vacuum tube biased to cut-off and connected to said wave producer for signaling the absence of said pips from said wave, and a visual indicator adapted to be operated when said tube is rendered non-conductive.

2. In combination, means for generating a rising saw-tooth voltage wave, means for generating equispaced pips or voltage markers, means for superimposing said pips on said saw-tooth wave to provide an electrical precision time scale for ranging, means for signalizing the absence of pips from said composite wave, and reactance switching means for utilizing said rising wave as a medium precision time scale in the absence of said pips.

3. A ranging circuit comprising means for generating an exponentially rising wave with equispaced pips or voltage markers thereon adapted to provide an electrical precision time scale for ranging, means for signalizing the absence of said markers in said wave, and reactance control means for converting said accurate range circuit into a medium precision range circuit in the absence of said pips.

HENRY M. WATTS, Jr.

REFERENCES CITED

The following references are of record in the file of this patent:

UNITED STATES PATENTS

| Number | Name | Date |
|---|---|---|
| 2,018,851 | Green et al. | Oct. 29, 1935 |
| 2,018,859 | Leibe | Oct. 29, 1935 |
| 2,367,378 | Schick | Jan. 16, 1945 |
| 2,405,238 | Seeley | Aug. 6, 1946 |
| 2,422,205 | Meacham | June 17, 1947 |